United States Patent [19]
Ichimura et al.

[11] Patent Number: 5,346,876
[45] Date of Patent: Sep. 13, 1994

[54] AIR PURIFYING AGENT AND A PROCESS FOR PRODUCING SAME

[75] Inventors: Shozo Ichimura; Seikichi Tabei; Michinori Hashimoto, all of Tokyo, Japan

[73] Assignee: Nippon Chemical Industrial Co., Ltd., Tokyo, Japan

[21] Appl. No.: 66,219

[22] Filed: May 25, 1993

[51] Int. Cl.$^5$ .................. B01J 20/20; A61L 9/16; B01D 53/04; B01D 53/36
[52] U.S. Cl. ........................ 502/417; 422/4; 423/230; 423/244.03; 423/245.1; 502/181
[58] Field of Search .............. 502/417, 416, 181

[56] References Cited

FOREIGN PATENT DOCUMENTS

| | | | |
|---|---|---|---|
| 068136 | 4/1986 | Japan | 502/417 |
| 161372 | 7/1987 | Japan | 502/417 |
| 262742 | 11/1987 | Japan | 502/416 |
| 288545 | 12/1991 | Japan | 502/417 |

Primary Examiner—Paul E. Konopka
Attorney, Agent, or Firm—Oblon, Spivak, McClelland, Maier & Neustadt

[57] ABSTRACT

An air purifying agent comprising a carbonaceous carrier and activated manganese dioxide and iodate supported thereon. According to the present invention, there can be provided an air purifying agent which is safe to handle and exhibits sufficient effect for removing contaminated gases.

16 Claims, No Drawings

AIR PURIFYING AGENT AND A PROCESS FOR PRODUCING SAME

BACKGROUND OF THE INVENTION

1. Field of the Invention

The present invention relates to an air purifying agent and a process for producing same. More particularly, the present invention relates to a highly effective air purifying agent which can effectively purify even the environmentally polluted air by various harmful gases that has very low concentrations of contaminants and a process for producing same.

2. Description of Prior Art

Nowadays, it has become a large problem to clean the earth's environment. In particular, control and prevention of air pollution is a pressing problem, and there has been a strong demand for purifying polluted air by various harmful gases which contains low concentrations of contaminating gaseous substances around all types of environments including working environments in various industries and living environments.

Heretofore, as means for purifying air, dry-type processes and wet-type processes have been known. Among these processes, in view of convenience, a dry-type purification process using activated carbon has been practically utilized. On the other hand, various kinds of air purifying agents which exhibit a selective adsorbing effect according to the type of contaminated gas have been developed. For example, an air purifying agent which comprises supporting basic or acidic chemical components on a porous carrier is effective for removal of an acidic gas or basic gas, respectively. Particularly, air purifying agents which comprise supporting an oxidizing or reducing agent on a carrier have been widely used in industrial fields since they have high decomposing and purifying effects on contaminated gases due to their powerful oxidation and reduction abilities.

Such air purifying agents have been proposed in Japanese Patent Application Laid Open Nos. 60-827, 3-23863, etc. as an air purifying agent comprising a carrier, such as activated alumina, zeolite, and so on, on which potassium permanganate is supported, and in Japanese Patent Application Laid Open Nos. 61-8136, 62-161372 and 62-161373 as an, air purifying agent comprising activated carbon on which iodate and/or inorganic acid are supported.

Although these air purifying agents have been made practical in accordance with their intended use, they have some defects in that they not only have certain respective demerits as well as merits, but they are also limited in use since they have peculiar physical properties.

For example, a potassium permanganate-based air purifying agent requires very careful treatment because it is soluble and powerful oxidizing agent and, consequently, cannot be used in conventional domestic field such as in the household environment. On the other hand, although the safety of activated carbon is high when being used, it has disadvantages in that not only is its ratio of removing contaminants in gases limited per se since its main removing mechanism is based on physical adsorption of the contaminants onto the activated carbon, but also in that when the activated carbon is saturated with the contaminants and the adsorbing effect is lost and desorption of the adsorbed contaminants could occur.

Accordingly, in many cases, such activated carbon-based air purifying agent is employed in a form in which chemical components are supported thereon. However, it can not be appreciably expected of its removing effect on low concentration of contaminants substances in gases or its sufficient life for effective use.

Recently, in order to improve accuracy or yield of products in the manufacturing field of precision electronics such as semiconductors, or in order to enable permanent preservation of high-class art such as paintings by preventing fading or color changing, there is a strong demand for the development of an air purifying agent which can completely and safely remove extremely low concentrations of contaminants in air.

SUMMARY OF THE INVENTION

In view of the requirements mentioned above, the present inventors carried out extensive studies. As a result, the present inventors have succeeded in obtaining an air purifying agent which is light in weight and safe, and which has a longer effective life, and furthermore, which exhibits excellent effects in removing low concentration of contaminants in gases.

Accordingly, it is an object of the present invention to provide such an air purifying agent and a process for producing same on an industrial scale.

The air purifying agent of the present invention is characterized by comprising a carbonaceous carrier on which activated manganese dioxide and iodate are supported.

DETAILED DESCRIPTION OF THE INVENTION

Examples of the carbonaceous carriers used in the present invention include activated carbon, graphite, carbon black, and so on. Among these, activated carbon is particularly preferred. Any activated carbon may be used regardless of its kinds or production history, such as wood, coconut husks, sawdust, coal, lignite, brown coal, bamboo coal, and activated materials thereof. Any form of carbonaceous carrier may be used, such as powdery types, granular types, fibrous types and honeycomb types, and the proper type of carrier may be selected according to its intended use.

As an activated manganese dioxide to be supported on the carbonaceous carrier of the present invention, either a product obtained by reductive decomposition of potassium permanganate or a product obtained by oxidative decomposition of manganese hydroxide is used. From the aspect of efficiency and production, it is preferred to use a decomposed product derived from potassium permanganate.

In addition, the activated manganese dioxide may contain a small amount of fine particles of metals or metal compounds, such as copper, vanadium, silver, palladium, platinum, compounds thereof, and so on, as required.

The iodate, i.e., the salt of iodic acid, which is another of the chemical components to be supported on the carbonaceous carrier of the present invention, is preferably potassium iodate. Other alkali metal salts, such as sodium iodate, lithium iodate, etc., and alkali earth metal salts, such as calcium iodate, magnesium iodate, barium iodate, etc., may be available, as well.

The amount of the activated manganese dioxide and iodate to be supported on the carbonaceous carrier should be determined depending on the intended use of the resulting air purifying agent and properties of contaminated gas to be purified. In many cases, the total amount of these two chemical components may vary in the range of 0.1 to 20 wt %, preferably 0.3 to 10 wt %, per total weight of the air purifying agent. In the above determined amounts, the ratio of activated m nganese dioxide (as $MnO_2$) to iodate may vary in the range of 1:0.1 to 9 by weight, preferably 1:0.5 to 5 by weight.

Furthermore, the air purifying agent of the present invention may contain water in the amount of over equilibrium water content so long as it is neither solidified by aggregation nor changes in quality in the process of storage, transport or handling. It is rather more preferable that the water content of the air purifying agent is about 5 to 15 wt %. In this case, the expression "water" as used herein means all components contained in the air purifying agent which will be lost when the air purifying agent is dried at 100 C. for one hour, and the water content is defined as a ratio relative to the air purifying agent.

The air purifying agent of the present invention can be designed into various types of forms depending on the form of its carrier. In any type of air purifying agent except the honey-comb type, the ones which have a pore volume of 0.5 to 1.0 ml/g, preferably 0.6 to 0.9 ml/g by the determination of tetrachloromethane substituted absorption method exhibit a good air purifying effects.

The process for producing the air purifying agent mentioned above according to the present invention is characterized by adsorptively supporting a mixed aqueous solution of potassium permanganate and iodate on a carbonaceous carrier.

The mixed aqueous solution of potassium permanganate and iodate is stable by itself without any substantial redox reaction occurring. However, when the solution is puts in contact with the carbonaceous carrier, only potassium permanganate in the solution is reduced to be converted into activated manganese dioxide. This conversion phenomenon can be recognized by the disappearance of the purplish red color based on the presence of $MnO_4^-$ in the mixed solution after contact with the carbonaceous carrier.

On the other hand, iodate becomes more stable on the carrier under the presence of activated manganese dioxide, i.e., an insoluble oxidant, than in the case in which iodate exists alone. Accordingly, an air purifying agent which is prepared by enjoying such effect becomes more stable and has excellent purifying ability against polluted gases over a long period of time.

The method for adsorptively supporting a mixed aqueous solution of chemical components on a carbonaceous carrier is not limited particularly so far as the chemical components can be supported uniformly in the above described ratio. A direct mixing method using a proper mixer or a spray mixing method are practically available. For example, by a method in which a mixed aqueous solution of chemical components is sprayed on a carbonaceous carrier which is being mixed in the mixer, a carrier uniformly supporting the chemical components thereon can be obtained. In this case, the concentration or mixing ratio of chemical components and water in mixed solution may be determined within the range determined as the amount of the supported chemical components and water content relative to the air purifying agent.

Therefore, when the mixed aqueous solution of chemical components is prepared so that its water content is within the range of allowable water content determined in the present air purifying agent, the resulting air purifying agent can be used as a finished product without a special subsequent treatment after mixing treatment of a carbonaceous carrier with chemical components. On the other hand, in case of excess of water being contained or high strength of the resultant moldings being required, a drying treatment may be carried out, if necessary.

In the supporting process of chemical components on a carbonaceous carrier, adjuvant components such as acids, alkalis and proper binders may be used simultaneously, as required.

The air purifying agent of the present invention can purify a variety of noxious gases or combinations thereof effectively. For example, hydrogenated gases such as hydrogen sulfide, phosphines, arsines, germanes, silanes, etc., unsaturated hydrocarbons such as ethylene, ozone, CO, NOx, SOx, amines, mercaptans, carbonyl sulfide, aldehydes, phenols, etc., and the malodorous odors of sewage, animals and excrement which are contaminated by two or more of said gases or substances, can be effectively removed.

Moreover, the air purifying agent of the present invention has a sterilizing property due to its strong oxidizing power. Especially, ones on which copper or silver are supported exhibit a more highly effective antimicrobial activity. By using such air purifying agent, it may be possible to remove noxious microorganisms in air such as bacteria, molds and viruses, as well as said malodorous odors.

As mentioned above, the air purifying agent of the present invention comprises supporting an insoluble activated manganese dioxide and soluble iodate as active components on a carbonaceous carrier. Accordingly, by using such an air purifying agent, it can be possible to effectively decompose or adsorb the noxious contaminated gases or contaminants substances in air by the synergistic effect of the adsorptability and reduction power of the carbonaceous carrier itself and the two different strong oxidation powers of the chemical components. This synergistic effect enables the powerful removing effect of the air purifying agent to be maintained over a long period of time.

The air purifying agent of the present invention has an extremely broad removal concentration spectrum for contaminants components or noxious components in air, and is highly safe for use.

As mentioned above, according to the present invention, there can be provided an air purifying agent which exhibits an excellent effects for removing contaminated gas containing low concentrations of contaminant substances over a long period of time, and a process for producing such air purifying agent on industrial scale. As the air purifying agents of the present invention is extremely safe to handle and do not contain soluble $MnO_4^-$ derived from, for example, $KMnO_4$, the air purifying agent of the present invention is extremely useful in a wide range of applications such as in industrial and domestic fields.

EXAMPLES

There now follow a number of Examples and Comparative Examples which illustrate the present invention concretely.

Examples 1 to 4 and Comparative Examples 1 to 3

On granular coconut husk activated carbon (particle diameter: 3 to 5 mm), a mixed aqueous solution of a prescribed amount of potassium permanganate and potassium iodate with 100 parts by weight of water was supported by being sprayed on as the coconut husk activated carbon was fludized by using a Nouter mixer to prepare four kinds of air purifying agents. The resulting samples called Samples B, C, D and E were used as test samples for Examples 1 to 4, respectively.

Comparative air purifying agents in which potassium permanganate and/or potassium iodate were not supported were also prepared as test samples for Comparative Examples 1 to 3. The resulting samples were called Sample A, F and G.

When the Samples A to E were soaked out in water, no purplish red coloration which indicates the presence of $MnO_4^-$ was substantially recognized and it was proved that $MnO_4^-$ in the water solutions was converted to insoluble activated manganese dioxide in the carrier.

The resulting Samples A to G were charged into Pyrex tube columns (inside diameter: 25 mm, length: 350 mm) to be evaluated for their effectiveness in removing hydrogen sulfide under the following conditions:

Gas concentration at tube entrance: about 10 ppm of $H_2S$;
Gas temperature and humidity at tube entrance: 22° to 25° C., 55 to 65% of RH;
Gas flow rate and veocity in tube: 10.3 l/min, 0.35 m/sec;
Space velocity (SV): 20000 (l/H);
Measurement method: Gastech detector tube method (detection limit: 0.1 ppm $H_2S$).

The results are shown in Table 1 below with composition and pore volume of each sample.

TABLE 1

| Example (Ex.) & Comparative Example (CEx.) | Sample | Composition ※ $KMnO_4$ | $KIO_3$ | $H_2O$ | Pore Volume (ml/g) | $H_2S$ removal ratio 3 hr | 5 hr | 10 hr |
|---|---|---|---|---|---|---|---|---|
| CEx. 1 | A | 4.0 | 0 | 9.5 | 0.80 | 97.0 | 95.0 | 94.5 |
| Ex. 1 | B | 0.50 | 0.50 | 10.5 | 0.75 | 99.0 | 98.5 | 98.5 |
| Ex. 2 | C | 0.40 | 0.20 | 10.1 | 0.78 | 98.5 | 98.0 | 98.0 |
| Ex. 3 | D | 0.27 | 0.35 | 9.0 | 0.82 | 98.6 | 98.5 | 98.5 |
| Ex. 4 | E | 0.70 | 0.30 | 10.1 | 0.79 | 98.8 | 98.5 | 98.2 |
| CEx. 2 | F | 0 | 1.0 | 9.5 | 0.78 | 98.0 | 95.0 | 92.5 |
| CEx. 3 | G | 0 | 0 | 4.5 | 0.66 | 65.0 | 8.0 | 0 |

※ Expressed as $KMnO_4$. When used as air purifying agent $KMnO_4$ was converted to activated $MnO_2$.

Examples 5 and 6 and Comparative Example 4

A potassium permanganate-based air purifying agent (strength of particle: 3 kg/particle, pore volume: 0.52 ml/g) was prepared by first mixing and kneading of 60 parts by weight of activated alumina, 10 parts by weight of bentonite, 10 parts by weight of sepiolite, 5 parts by weight of potassium permanganate, 10 parts by weight of slaked lime and 21 parts by weight of silica sol ($SiO_2$: 30 wt %) with a proper amount of water, followed by pelletizing and then drying treatment. The resultant sample (Sample H) was a test sample for Comparative Example 4.

Next, the thus obtained Sample H and Samples B and D used in Examples 1 and 3 respectively, were subjected to a long-term gas removing test (240 to 10000 hr) against a very dilute $H_2S$ gas under the following conditions:

Gas concentration at tube entrance: about 500 ppb of $H_2S$;
Gas temperature at tube entrance: 22° to 25° C.;
Gas humidity at tube entrance: 60 to 70% of RH;
Space velocity (SV): 5000 (l/H);
Measurement method: analytical method by gas chromatograph.

The results are shown in Tables 2 and 3 below.

TABLE 2

| Ex. | Sample | Time (hr) | 240 | 792 | 1362 | 1704 | 2590 | 3694 | 4678 |
|---|---|---|---|---|---|---|---|---|---|
| 5 | B | Inlet (ppb) | 498 | 548 | 560 | 454 | 524 | 710 | 515 |
|  |  | Outlet (ppb) | 0.12 | 0.12 | 0.12 | 0.10 | 0.12 | 0.09 | 0.07 |
|  |  | Removal rate (%) | 99.9 | 99.9 | 99.9 | 99.9 | 99.9 | 99.9 | 99.9 |
| 6 | D | Inlet (ppb) | 482 | 482 | 522 | 462 | 504 | 750 | 530 |
|  |  | Outlet (ppb) | 0.09 | 0.12 | 0.11 | 0.10 | 0.11 | 0.09 | 0.07 |
|  |  | Removal rate (%) | 99.9 | 99.9 | 99.9 | 99.9 | 99.9 | 99.9 | 99.9 |
| 4 | H | Inlet (ppb) | 495 | 503 | 485 | 496 | 513 | 520 | 515 |
|  |  | Outlet (ppb) | 0.10 | 0.16 | 0.20 | 0.80 | 7.7 | 15.6 | 25.2 |
|  |  | Removal rate (%) | 99.9 | 99.9 | 99.9 | 99.8 | 98.5 | 97.0 | 95.1 |

TABLE 3

| Ex. | Sample | Time (hr) | 5830 | 6526 | 7498 | 8000 | 9008 | 10000 |
|---|---|---|---|---|---|---|---|---|
| 5 | B | Inlet (ppb) | 593 | 536 | 572 | 497 | 508 | 457 |
|  |  | Outlet (ppb) | 0.38 | 0.26 | 0.40 | 0.20 | 0.11 | 0.11 |
|  |  | Removal rate (%) | 99.9 | 99.9 | 99.9 | 99.9 | 99.9 | 99.9 |
| 6 | D | Inlet (ppb) | 560 | 532 | 547 | 475 | 508 | 457 |

TABLE 3-continued

| Ex. | Sample | Time (hr) | 5830 | 6526 | 7498 | 8000 | 9008 | 10000 |
|---|---|---|---|---|---|---|---|---|
| | | Outlet (ppb) | 0.28 | 0.21 | 0.21 | 0.18 | 0.11 | 0.11 |
| | | Removal rate (%) | 99.9 | 99.9 | 99.9 | 99.9 | 99.9 | 99.9 |
| CEx. 4 | H | Inlet (ppb) | 510 | 526 | 540 | 525 | 503 | 490 |
| | | Outlet (ppb) | 40.3 | 62.1 | 90.7 | 102.4 | 113.2 | 111.8 |
| | | Removal rate (%) | 92.1 | 88.2 | 83.2 | 80.5 | 77.5 | 78.8 |

Example 7 and Comparative Example 5

Sample D used in Example 3 and sample H used in Comparative Example 4 were subjected to a gas removing test against $SO_2$ gas under the following conditions:

Gas concentration at tube entrance: about 200 to 300 ppb of $SO_2$;
Gas temperature at tube entrance: 22° to 25° C.;
Gas humidity at tube entrance: 55 to 65% of RH;
Gas flow rate: 20 l/min;
Space velocity (SV): 50000 (l/H);
Column: inside diameter: 25 mm, length 350 mm (Pyrex tube);
Measurement method: analytical method by gas chromatograph.

The results are shown in Table 4 below.

TABLE 4

| Ex. | Sample | Time (hr) | 1 | 3 | 6 | 24 | 168 |
|---|---|---|---|---|---|---|---|
| 7 | D | Inlet (ppb) | 283 | 214 | 244 | 309 | 244 |
| | | Outlet (ppb) | 0.86 | 0.08 | 0.07 | 0.64 | 0.82 |
| | | Removal rate (%) | 99.7 | 99.9 | 99.9 | 99.8 | 99.7 |
| CEx. 5 | H | Inlet (ppb) | 283 | 214 | 244 | 309 | 244 |
| | | Outlet (ppb) | 0.81 | 0.70 | 0.57 | 2.20 | 11.2 |
| | | Removal rate (%) | 99.7 | 99.7 | 99.8 | 99.3 | 95.4 |

Example 8 and Comparative Example 6

Sample D used in Example 3 and Sample H used in Comparative Example 4 were subjected to a gas removing test against a hydrogen sulfide-toluene mixed gas under the following conditions:

Gas concentration at tube entrance: about 20 ppm of $H_2S$ + about 50 ppm of toluene (mixed gas);
Gas temperature at tube entrance: 23° to 25° C.;
Gas humidity at tube entrance: 60 to 70% RH;
Gas flow rate: 10 l/min;
Space velocity (SV): 50000 (l/H);
Column: inside diameter: 25 mm, length 350 mm;
Measurement method: Gastech detector tube method (4LL) (122).

Toluene was generated by using a standard gas generator (permeator).

The results are shown in Tables 5 and 6 below.

"ND" in Tables 5 and 6 means that gas was not detected.

TABLE 5

| | | Time (hr) | 1 | | 2 | |
|---|---|---|---|---|---|---|
| Ex. | Sample | Component | $H_2S$ | Toluene | $H_2S$ | Toluene |
| 8 | D | Inlet (ppm) | 20 | 50 | 20 | 50 |
| | | Outlet (ppm) | ND | ND | 0.2 | ND |
| | | Removal rate (%) | 99 | 98 | 99 | 98 |
| CEx. 6 | H | Inlet (ppm) | 20 | 50 | 20 | 50 |
| | | Outlet (ppm) | 1.6 | 50 | 2.0 | 50 |
| | | Removal rate (%) | 95.0 | 0 | 90.0 | 0 |

TABLE 6

| | | Time (hr) | 4 | | 6 | |
|---|---|---|---|---|---|---|
| Ex. | Sample | Component | $H_2S$ | Toluene | $H_2S$ | Toluene |
| 8 | D | Inlet (ppm) | 20 | 50 | 20 | 50 |
| | | Outlet (ppm) | 0.4 | ND | 1.0 | ND |
| | | Removal rate (%) | 98 | 98 | 95 | 98 |
| CEx. 6 | H | Inlet (ppm) | 20 | 50 | 20 | 50 |
| | | Outlet (ppm) | 4.0 | 50 | 5.0 | 50 |
| | | Removal rate (%) | 80 | 0 | 75 | 0 |

Example 9 and Comparative Example 7

Sample D used in Example 3 and Sample H used in Comparative Example 4 were subjected to a removing test against odor of digested sludge of a sewage disposal plant (as odor density) under the following conditions:

Odor density: about 1000;
Gas temperature at tube entrance: 20° to 27° C.;
Gas humidity at tube entrance: 60 to 70% of RH;
Gas flow rate: 10 l/min;
Space velocity (SV): 20000 (l/H);
Column: inside diameter: 25 mm, length 350 mm;
Measurement method: three-point odor bag method.

The results are shown in Table 7.

In Table 7, when the odor density is grade 10 or less, little odor is perceived.

TABLE 7

| Ex. | Sample | Time | 30 min | 1 hr | 2 hr | 4 hr | 6 hr |
|---|---|---|---|---|---|---|---|
| 9 | D | Inlet | 1000 | 1000 | 1000 | 1000 | 1000 |
| | | Outlet | <10 | <10 | <10 | <10 | <10 |
| CEx. 7 | H | Inlet | 1000 | 1000 | 1000 | 1000 | 1000 |
| | | Outlet | 10 | 15 | 20 | 50 | 80 |

Example 10 and Comparative Examples 8 to 10

Sample D used in Example 3, Samples F and H used in Comparative Examples 2 and 4, respectively, and Sample I (commercial product: manganese ferrite-based air purifying agent) were subjected to a removing test against ethyl mercaptan ($C_2H_5SH$) under following conditions:

Gas concentration: 100 to 140 ppm $C_2H_5SH$
Gas temperature at tube entrance: 23° to 26° C.;

Gas humidity at tube entrance: 73 to 83% of RH;
Space velocity (SV): 5000 (1/H);
Gas flow rate: 4 1/min;
Measurement method: odor test by using Gastech detector tube No. 72.

The results are shown in Table 8 below.

TABLE 8

| Ex. | Sample | 1 hr | 2 hr | 4 hr | 5 hr | 10 hr | 24 hr |
|---|---|---|---|---|---|---|---|
| 10 | D | 100 | 99.9 | 99.9 | 99.9 | 99.9 | 99.9 |
| CEx. | | | | | | | |
| 8 | F | 99.9 | 99.9 | 99.9 | 98.5 | 97.3 | 91.6 |
| 9 | H | 96.2 | 84.2 | 80.2 | 79.0 | 74.2 | — |
| 10 | I | 96.4 | 92.2 | 91.4 | 91.0 | 88.2 | — |

Example 11 and Comparative Examples 11 to 14

Activated carbon honey-combs (bore size: 1 mm) were cut off into 22 mm×22 mm×9 mm pieces by using a diamond cutter, and soaked in an aqueous solution which contained 4 parts by weight of potassium permanganate and 5 parts by weight of potassium iodate per 1000 parts by weight of the carbon at 45° C. for 30 minutes, followed by drying treatment to obtain an air purifying agent with a water content of 9.5% by weight. The resulting sample was called Sample J. When Sample J was soaked out in water, no purplish red coloration indicating the presence of $MnO_4^-$ was recognized to prove that $MnO_4^-$ was converted to activated manganese dioxide and supported on the carrier.

Four kinds of comparative air purifying agents were also prepared by supporting 4% by weight of potassium permanganate on activated alumina honey-combs (bore size: 1 mm); by supporting 1% by weight of potassium iodate on honey-combs similar to those above; by supporting 3% by weight of potassium permanganate on zeolite honey-combs; and by using activated carbon honey-combs alone. The resulting samples were called Samples K, L, M and N respectively.

These samples were evaluated for their effectiveness in removing $SO_2$ gas under the following conditions:
Gas concentration at tube entrance: 585 ppm of $SO_2$;
Gas temperature at tube entrance: room temperature;
Gas humidity at tube entrance: 50 to 60% RH;
Space velocity (SV): 25000 (1/H);
Measurement method: Gastech detector tube method.

The results are shown in Table 9 below.

TABLE 9

| Ex. | Sample | 30 min | 1 hr | 2 hr |
|---|---|---|---|---|
| 11 | J | 99.0 | 98.8 | 98.0 |
| CEx. | | | | |
| 11 | K | 78.5 | 73.6 | 70.2 |
| 12 | L | 80.3 | 75.4 | 72.1 |
| 13 | M | 76.9 | 72.6 | 73.1 |
| 14 | N | 60.5 | 10.3 | — |

What is claimed is:

1. (Amended) An air purifying agent comprising activated manganese dioxide and iodate supported on a carbon carrier, wherein the total amount of supported chemical components is within the range of 0.1 to 20% by weight relative to the total weight of the agent, and wherein the weight ratio of activated manganese dioxide calculated as $MnO_2$ to iodate is within the range of about 1:0.1-9.

2. An air purifying agent according to claim 1, wherein said activated manganese dioxide is a product obtained by decomposition of potassium permanganate and said iodate is potassium iodate.

3. An air purifying agent according to claim 1 or 2, wherein the pore volume of said agent is within the range of 0.5 to 1.0 ml/g.

4. An air purifying agent according to claim 1, wherein said agent is a honey-comb type form.

5. The agent of claim 1 wherein said carbon carrier is selected from the group consisting of activated carbon, graphite, and carbon black.

6. An air purifying agent according to claim 1, wherein said agent contains water of the range of 5 to 15% by weight with respect to total weight.

7. The agent of claim 2 wherein said carbon carrier is selected from the group consisting of activated carbon, graphite, and carbon black.

8. The agent of claim 3 wherein said carbon carrier is selected from the group consisting of activated carbon, graphite, and carbon black.

9. The agent of claim 4 wherein said carbon carrier is selected from the group consisting of activated carbon, graphite, and carbon black.

10. The agent of claim 6 wherein said carbon carrier is selected from the group consisting of activated carbon, graphite, and carbon black.

11. The agent of claim 1 wherein said carbon is activated carbon derived from a carbonaceous material selected from the group consisting of wood, coconut husks, sawdust, coal, lignite, brown coal and bamboo coal.

12. The agent of claim 2 wherein said carbon is activated carbon derived from a carbonaceous material selected from the group consisting of wood, coconut husks, sawdust, coal, lignite, brown coal and bamboo coal.

13. The agent of claim 3 wherein said carbon is activated carbon derived from a carbonaceous material selected from the group consisting of wood, coconut husks, sawdust, coal, lignite, brown coal and bamboo coal.

14. The agent of claim 4 wherein said carbon is activated carbon derived from a carbonaceous material selected from the group consisting of wood, coconut husks, sawdust, coal, lignite, brown coal and bamboo coal.

15. The agent of claim 6 wherein said carbon is activated carbon derived from a carbonaceous material selected from the group consisting of wood, coconut husks, sawdust, coal, lignite, brown coal and bamboo coal.

16. A process for producing an air purifying agent, comprising impregnating a carbon carrier with an aqueous solution of potassium permanganate and iodate, whereby said permanganate is reduced to activated manganese dioxide, and wherein said agent contains water in an amount between 5 and 15 weight percent based on the weight of the agent wherein said water contained in said agent is the amount of water lost by the air purifying agent when dried at 100° C. for one hour.

* * * * *